(12) United States Patent
Pilu

(10) Patent No.: US 7,653,259 B2
(45) Date of Patent: Jan. 26, 2010

(54) IMAGE CAPTURE METHOD, DEVICE AND SYSTEM

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 963 days.

(21) Appl. No.: 10/816,885

(22) Filed: Apr. 5, 2004

(65) Prior Publication Data

US 2004/0202382 A1 Oct. 14, 2004

(30) Foreign Application Priority Data

Apr. 11, 2003 (GB) ................................. 0308393.8

(51) Int. Cl.
*G06K 9/00* (2006.01)

(52) U.S. Cl. ....................... 382/276; 382/115; 382/117; 382/118

(58) Field of Classification Search ................. 382/118, 382/115, 117, 276
See application file for complete search history.

(56) References Cited

U.S. PATENT DOCUMENTS

| | | | |
|---|---|---|---|
| 5,764,383 A | 6/1998 | Saund et al. | |
| 6,067,399 A * | 5/2000 | Berger | 386/46 |
| 6,801,642 B2 * | 10/2004 | Gorday et al. | 382/118 |
| 6,868,229 B2 * | 3/2005 | Balogh | 386/117 |

FOREIGN PATENT DOCUMENTS

| | | | |
|---|---|---|---|
| JP | 2001313006 A | * | 11/2001 |
| JP | 2003-087632 | | 3/2003 |
| WO | WO/9533342 | | 12/1995 |
| WO | 2001/62006 | | 8/2001 |
| WO | 2004/003827 | | 1/2004 |

OTHER PUBLICATIONS

Patent Abstracts of Japan—2003046745A—Feb. 14, 2003, Matsushita Electric Ind. Co., Ltd.
Patent Abstracts of Japan—2001235812A—Aug. 31, 2001, Noritsu Koki. Co., Ltd.
Patent Abstracts of Japan—2001313006A—Nov. 9, 2001, Nishisaka Kiyotaka.
C.R. Dance, "Perspective estimation for document images". Proceedings of the SPIE, SPIE, Bellingham, VA. US. vol. 4670, 2001, pp. 244-254.
P. Clark et al., "Location and recovery of text on oriented surfaces" Proceedings of the SPIE,SPIE, Bellingham VA, vol. 3967, 2000, pp. 267-277.
D. Liebowitz et al., "Metric rectification for perspective images of planes" Computer Vision and Pattern Recognition, 1998. Proceedings, 1998 IEEE Computer Society Conference on Santa Barbara, CA, USA, Jun. 23-25, 1998, Los Alamitos, CA, IEEE Comput. Soc, US pp. 482-489.
R. Horaud et al., "Vision par ordinateur", Hermes, Paris, 1993, pp. 131-156.
P. Clark et al. Estimating the Orientation and Recovery of Text Planes in a Single Image, Proceedings of the British Machine Vision Conference, Sep. 10, 2001, pp. 421-430.
International Search Report for European Patent Application 01 31 0728, dated Sep. 12, 2005.

* cited by examiner

*Primary Examiner*—Bhavesh M Mehta
*Assistant Examiner*—Michael Vanchy, Jr.

(57) ABSTRACT

A captured image of a scene is modified by detecting an inhibit signal emanating from an inhibitor device carried by an object within the scene. In response to receipt of the inhibit signal, identifying a portion of the image corresponding to the object. The image object of the scene is modified by obscuring the image portion of the object.

21 Claims, 11 Drawing Sheets

IMAGE CAPTURE METHOD, DEVICE AND SYSTEM

RELATED APPLICATION

The present application is based on, and claims priority from, GB Application Number 0308393.8, filed Apr. 11, 2003, the disclosure of which is hereby incorporated by reference herein in its entirety.

FIELD OF THE INVENTION

The present invention relates to the field of image capture.

BACKGROUND TO THE INVENTION

Portable digital cameras have become miniaturized, and are becoming increasingly wide spread. Known mobile phone devices already have built in cameras, and picture messaging between mobile phones is an increasingly wide spread technology.

Further, wearable cameras are known, and have the potential for becoming widely used consumer products in the future.

For some persons, being included in photographs or picture messages when in public places has nuisance effect. Increasing usage of portable camera devices means that the privacy issue of capturing of images of subjects who would prefer not to be photographed has increased. Because portable cameras are small and are likely to be unseen by a subject, persons generally cannot choose to avoid being in the field of view of a small portable camera and are likely to have their pictures taken without their knowledge or consent.

The issue of privacy in relation to cameras is well known. Civil liberties organizations campaign for the right for people not to be photographed or videoed without their consent. However, with the widespread use of security cameras and other hand held portable camera devices, maintaining privacy from being photographed or videoed is becoming more difficult. Some security companies market their products as 'privacy friendly' because they are supposed to retain only images containing faces of known individuals, typically, potential or actual criminals. In 'Privacy issues of wearable camera's—v—surveillance cameras' by Steve Mann—HTTP//wearcam.org, 1995, it is suggested that security camera or wearable cameras should be made visible, and that a wearable camera should have a visual indicator that it is active for capturing an image. This does not offer actual privacy to individuals within the vicinity of the camera, but rather offers a chance to 'escape' from the field of view from a camera.

JP 10031265 discloses a device for preventing stealthy photographing in which a remote control receiver remotely controls a camera. The remote control receiver issues a warning sound when a camera captures an image. This does not prevent capture of a person's image, but rather alerts a person that a picture has been or could be taken.

Further, there are known security systems which are able to detect and identify faces of known criminals from security video footage, such as those available from Identix, and Viisage, for example the known FaceFINDER product.

US 20020039447 discloses a system for indexing, storage and retrieval of digital images, whereby photographs are sorted according to who is in a photograph, through face recognition algorithms.

US 20010016820 discloses a face identification system, whereby faces are removed from a memory device, having been identified.

JP 2001235812 discloses an image processing method and apparatus having a digital processing device with a masking pattern which can be superimposed on a portion of an image for obscuring that portion of the image. Control of the masking process lies with the operator of the photographic processing device. A person whose image has been captured by the device has no control over the processing of the image or whether the image can be captured or not.

The ImageId company www.imageID.com has a known product, whereby a user wears a tag. The tags are recognized by cameras and used to sort out images of people. The product recognizes and reads a set of markings within an image, and then sorts and stores matching identification codes in a database.

U.S. Pat. No. 6,067,399 discloses a privacy mode for cameras and camcorders. Images of persons' faces recorded on a camera or camcorder are detected and obscured. In U.S. Pat. No. 6,067,399 the person whose image is being captured has no control over whether a privacy mode of a camera or camcorder apparatus is set or not. Instead, an operator of the camera/camcorder determines the privacy mode. Therefore, privacy is not in the control of a person whose image is being captured.

JP 2001313006, discloses a method and apparatus in which a person who does not wish to be photographed carried a portable device which emits infra-red light which 'floods' a sensor or film of a camera, thereby blanking the image. However, the method disclosed in JP 2001313006 disables image capture completely and inhibits all images being taken, within range of the device.

SUMMARY OF THE INVENTION

According to one aspect a captured image of a scene is modified by a method and apparatus for detecting an inhibit signal emanating from an inhibitor device carried by a person within the scene. In response to the inhibit signal, (a) a portion of the image corresponding to the person is identified; and (b) the image of the scene is modified to obscure the image portion of the person.

BRIEF DESCRIPTION OF THE DRAWINGS

For a better understanding of the invention and to show how the same can be carried into effect, there is now described by way of example only, specific embodiments, methods and processes according to the present invention with reference to the accompanying drawings in which.

DETAILED DESCRIPTION OF THE DRAWING

There is now described by way of example only specific embodiments of the invention. In the following description numerous specific details are set forth in order to provide a thorough understanding. It will be apparent however, to one of ordinary skill in the art, that the present invention can be practiced without limitation to these specific details. In other instances, well known methods and structures have not been described in detail so as not to unnecessarily obscure the description.

In this document, the term 'scene image', relates to an electronic image of a scene, and includes both a still image, and a video sequence.

In this document, the term 'image capture device' relates to any device capable of capturing an image, and includes but is not limited to digital still cameras, and video cameras.

Specific embodiments relate to a person's image being made available to an image capture device, particularly although not exclusively a portable image capture device, without the consent of the person.

In one embodiment, a wearable device broadcasts an inhibit message to an area immediately surrounding a host wearer of the device. Any portable image capture devices, such as cameras or the like of third parties within range of the device receive the inhibit message, and in response to receiving the inhibit message, inhibit capture and/or apply processing of an image or part of an image.

Figure 1:
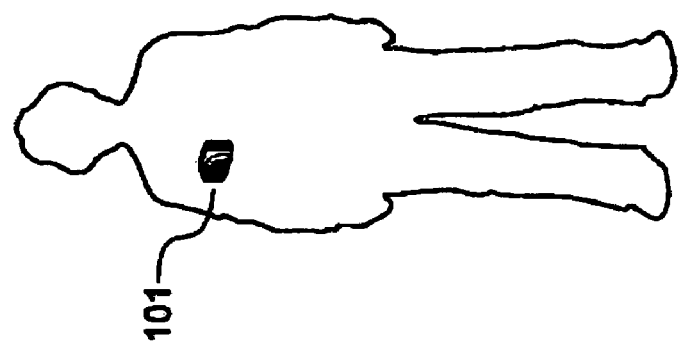
FIG. 1 is a schematic illustration of a first embodiment of an image capture system comprising an image capture device, and at least one inhibitor device for controlling operation of the image capture device for taking images of a host wearer of the inhibitor device.
Figure 1:
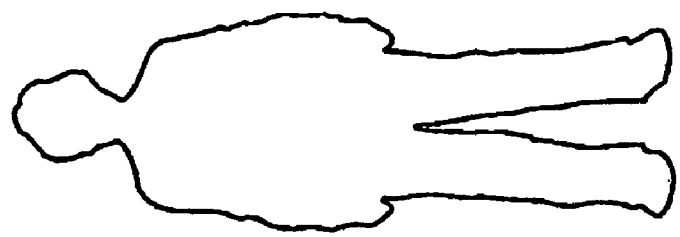
Figure 1:
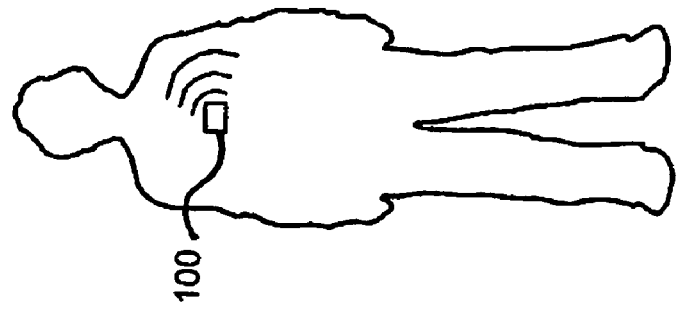

Referring to FIG. 1 herein, there is illustrated schematically an inhibitor device 100 and an image capture device 101 in close proximity, in which the inhibitor device broadcasts an inhibit signal carrying an image capture inhibitor message. Camera device 101, picks up the signal carrying the inhibit message. On receiving the inhibit message, the image capture device reacts in various ways.

In one mode of operation, the image capture device 101 captures an image of a scene, which includes a host wearer of the inhibitor device 100. However, the image capture device 101 is unable to print or store a portion of the captured scene image which corresponds to a wearer of the inhibitor device 100. Data processing components within the image capture device 101 modify the scene image by (1) identifying areas of the scene image which relate to a person wearing inhibitor device 100, and (2) obliterating selected parts of the image of the wearer of the inhibitor device. The selected parts of the image which are obliterated typically comprise facial features, and also can include items of clothing.

Some specific embodiments described herein operate such that images which include people who prefer not to have their images captured are automatically and forcefully modified before viewing. In some embodiments the images are modified before storage, such that images of such persons are no longer recognizable in the captured image. Suitably, only the portion of an overall image which relates to a person who seeks privacy is obliterated from the image, leaving the remainder of the overall image intact.

The inhibitor device 100 sends an inhibit message either omni-directionally, or directionally. The image capture device 101 can receive one or more inhibit messages at the same time, either omni-directionally, or directionally.

The inhibit message sent by device 100 can be carried on a signal carrier including but not limited to an ultrasonic signal carrier; a microwave signal carrier; a radio frequency signal carrier; a visual light signal, or an infrared light signal.

In the second mode of operation an inhibit signal generated from a position within a field of view of image capture device 101 is identified, and its position within a capture image taken of that field of view is established. Having established the position of the inhibit signal within the field of view and its position within a captured image, a portion of the image relating to a wearer of the inhibitor device is located. This can be done by device 101 using a pattern recognition algorithm. A suitable face detection algorithm is disclosed in '*Neural network based face detection*' Rowley, Baluga, Kanade, IEEE PAMI 20(1): pages 23-38. Capture device 101 identifies an image of a host wearer's face, device 101 can employ a further image-processing algorithm to obliterate or obscure details of the person's face. This can be done by reducing the resolution of the image corresponding to the person's face, or by blanking out that portion of the image, or any other like obliteration or obscuring method of the portion of the image.

In one specific embodiment, the inhibit message from device 100 is carried by an inhibit signal in the form of a physical light, or an infrared light. Such a light is detected by device 101 within the captured image, as a high intensity light spot. Device 101 thereby identifies within the image, the position of a wearer of the inhibitor device 101. In this embodiment, there is a line of sight view between the inhibitor device 100, and the image capture device 101.

In other embodiments, the inhibitor device 100 sends an ultrasonic signal, or a radio frequency signal or a microwave signal, in which case a line of sight between the image capture device 101 and the inhibitor device 100 is not essential, but the image capture device includes a receiver device to detect the energy emitted by the inhibitor device. The problem of device 101 locating the position of the inhibitor device 100 within a captured image needs to be addressed.

Figure 2:
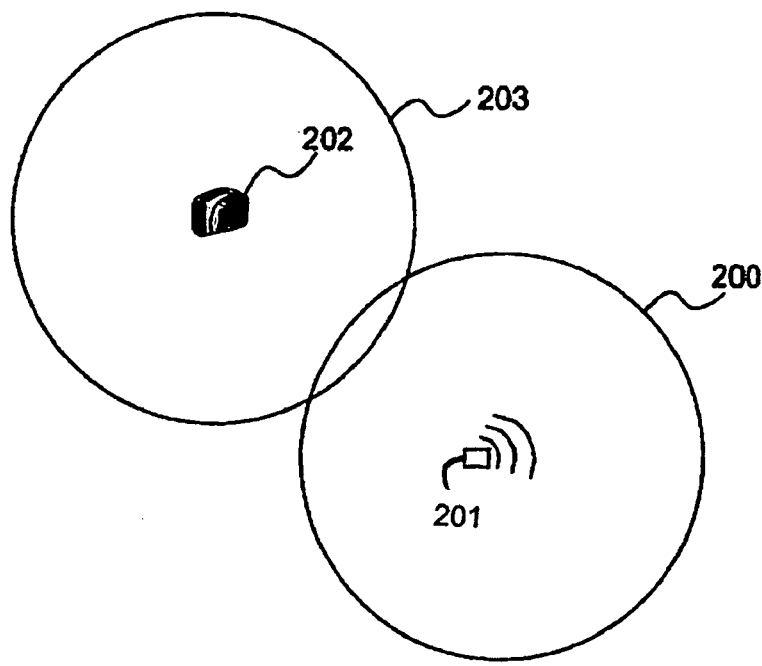
FIG. 2 is a schematic illustration of an omni-directional communication link between an inhibitor device and an image capture device of the system of FIG. 1.

FIG. 2 includes an omni-directional pattern having circular −3 dB level 200 associated with a signal transmitted by an inhibitor device 201. There is also shown an image capture device 202 having a receiver having an omni-directional pattern with a circular −3 dB level 203. Since the inhibitor device 201 transmits omni-directionally and the image capture device 202 receives an inhibit message with an omni-directional receive pattern, whenever the inhibitor device 201 is within close enough range of the image capture device to receive the inhibit message, the image capture device 202 is inhibited.

However, in other embodiments, the image capture device and/or the inhibitor device have directional responses for sending and/or receiving an inhibit message.

Figure 3:
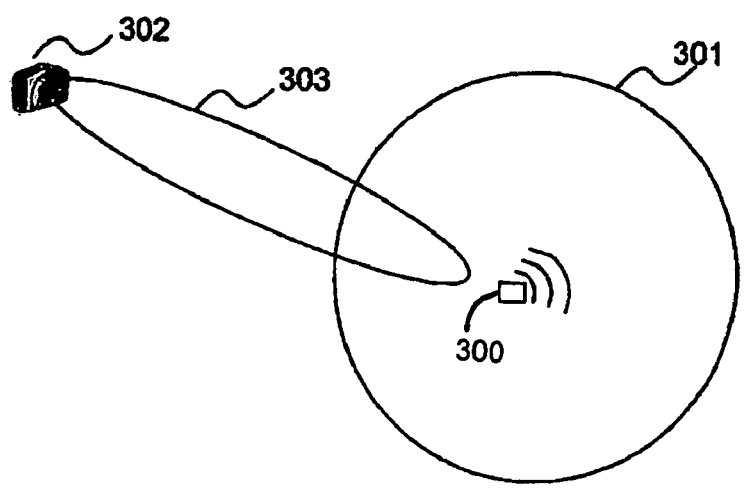
FIG. 3 is a schematic illustration of a second embodiment image capture system, in which a communication link uses a directional receiver beam between an image capture device and an inhibitor device in which the image capture device detects the inhibitor device.

Referring to FIG. 3 herein, there is illustrated schematically an inhibitor device 300 having an omni-directional pattern represented by a circular –3 dB power level 301, and an image capture device 302 having a directional receive beam represented by an elongated –3 dB level 303. When the image capture device 301 is pointing in a direction toward the inhibitor device 300, and device 301 is within range of being able to capture and recognize an inhibit message transmitted by the inhibitor device, the image capture device 301 is inhibited according to the modes described herein above.

Figure 4:
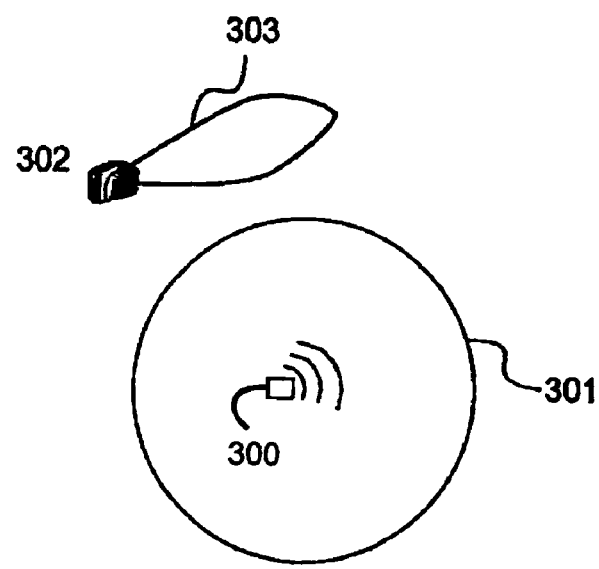
FIG. 4 is a schematic illustration of the inhibitor device and camera device of FIG. 3, in which the image capture device points in a direction away from the inhibitor device.

In FIG. 4, the image capture device 302 and inhibitor device 300 of FIG. 3 are positioned so narrow beam 303 of the image capture device points away from the inhibitor device. Because the receive beam 303 of the image capture device 302 is directional, the image capture device is not inhibited even though the image capture device and inhibitor device may be in relatively close proximity. This is because the image capture device 302 points away from the inhibitor device 300 and device 302 has a narrow inhibitor receive beam that corresponds with the optical field of view of device 302.

In this embodiment, the directional beam 303 of the image capture device 302 correspond with an optical field of view of image capture of device 302, such that when the image capture device is pointing in a particular direction for capturing an optical image of a scene, the inhibit receive beam of the image capture device coincides with the optical field of view. Signals from inhibitor devices 300 which are outside the optical field of view of the image capture device 302 are not acted upon by the image capture device, so that the image capture device is not inhibited by inhibitor devices 300 outside the optical field of view of device 302.

Figure 5:
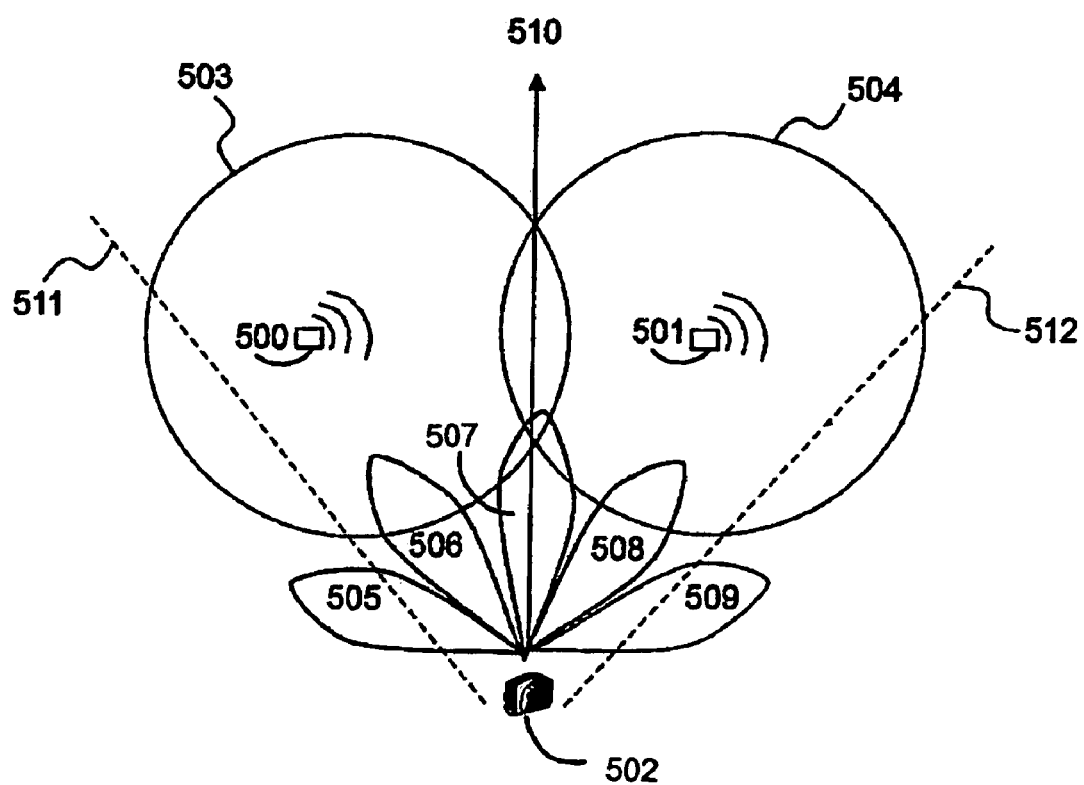
FIG. 5 is a schematic illustration of a scenario of two inhibitor devices and a single image capture device, the inhibitor device being in a field of view of the image capture device.

FIG. 5 is a schematic illustration of first and second inhibitor devices, 500, 501 respectively, worn by first and second persons (not shown) facing opposite to each other. Image capture device 502 is held or worn by a third person who is in the vicinity of the first and second persons wearing devices 500 and 501.

Each inhibitor device 500, 501 has a corresponding omni-directional antenna which produces a transmit pattern having a corresponding –3 dB level 503, 504 respectively. Image capture device 502 has a receiver having a plurality of directional, relatively narrow inhibit receive beam patterns 505 to 509, pointing in different directions from each other and relative to a primary (front) look direction 510 of the optical image of image capture device. Beams 505 and 509 have axes displaced by approximately 70° to the left and right of direction 510, beams 506 and 508 have axes displaced by approximately 45° to the left and right of direction 50, and central beam 507 has an axis substantially aligned with direction 510.

The plurality of directional beams 505-509 enable the image capture device 502 to distinguish between the first and second inhibitor devices 500, 501 within a field of view of the image capture device, identified as being between straight line extremities 511, 512, that are equal angles relative to direction 510. The beam with inhibit pattern 503 from first inhibitor device 500 is received on central beam 507 and first left beam 506 of the image capture device 502, whilst a second inhibitor message on the beam with inhibit pattern 504 from second inhibitor device 501 is received on the center beam 507 and first right beam 508.

However if an operator of the image capture device 502 swings the image capture device so that the field of view points towards the inhibitor device 500, then the directional receive beam 506 of the image capture device 502 receives a signal from inhibitor device 500, and the image capture device is inhibited according to the above described inhibited modes.

Processing steps carried out by an image capture device in a second mode of operation are described with reference to FIGS. 6 and 7.

Figure 6:
FIG. 6 is a schematic illustration of an example of an image captured by an image capture device before image processing is applied.

FIG. 6 is a captured still image of a scene in which a primary subject of the image is a violinist. However, because the image is captured in a public place, a restaurant in this case, the background of the scene image includes images of two other persons.

A person capturing the image using an image capture device is likely to have no interest in the two diners in the background. However, in the absence of any mechanism for protection against capture of their images the two diners have no choice but to be included in the image scene. The person capturing the image can use the image for his own purposes, including putting the image publicly in the Internet, or otherwise publishing the image. This is likely to occur without the knowledge of the two persons whose images are in the background of the scene image. The persons included in the background of the image might object to being included in the image, if they had known the image had been captured.

Figure 7:
FIG. 7 is a schematic illustration of the image of FIG. 6, after image processing is applied to modify the image taking account of inhibitor devices within a field of view of the image capture device.

FIG. 7 includes the same image scene as FIG. 6, but after data processing by an image capture device as described herein. The image of FIG. 7 was obtained as a result of the two diners wearing inhibit devices and the photographer using a capture device that has received inhibit messages from each of the diners in the background of the image scene.

The image capture device receives two inhibit messages, one from each inhibitor device, worn by each of the diners. In response to each inhibit message, the image capture device identifies a person wearing the corresponding inhibitor device. The image capture device processes each frame of image data, to identify images of individual wearers of the inhibitor devices, and then applies data processing to obliterate or remove portions of the image relating to the individual wearers of the inhibitor devices.

Correlation of an inhibit signal to a person in an image can be done in several ways. According to one embodiment, using known face-recognition software (for example as mentioned supra), the face nearest to the perceived origin of the inhibitor signal is located in a reference frame defined by the image, and the located face mosaiced out of the image by processing circuitry included in the image capture device.

As shown in FIG. 7, this results in a blurring of the face of each of the diners in the resultant image frame, thereby protecting the identity and privacy of each of those persons.

A portion of the image scene corresponding to a person's face or other features of the person is inhibited by obscuring, restricting usage of, replacing and/or deleting the part of the image by various methods including, but not limited to the following:

Firstly, the image detector can decrease resolution of the facial image portion, so that facial features become blurred and difficult for a human eye to resolve with accuracy. The decreased resolution can be achieved by a digital filtering algorithm, which applies a decrease in resolution to the image portion corresponding to a facial feature of a person.

The image detector can alternatively identify a portion of the image by a known algorithm for detecting skin tone colours within the image scene. The portion of the image corresponding to a person's face is obscured by overlaying a pre-determined graphic on that portion of the image, to obscure or obliterate facial features or other body features of the person.

The image detector can alternatively de-focus a portion of the image scene corresponding to a person's face or other body features so that it is difficult visually for a viewer to resolve the image with any detail.

Another approach is for the image detector to obscure the image portion corresponding to the person's face or other body features by changing an intensity level of the image portion. Typically, the image portion is darkened to obscure facial features.

The image detector can also completely delete the facial or other body portion of the image and replace it with a different image, such as a duplicate of another adjacent portion of the image scene. For example, in the images shown in FIGS. 6 and 7, a portion of the image scene corresponding to a person's face can be identified and removed from the image scene. The resulting gap in the image is replaced by an adjacent portion of the image scene, for example a background wall. The image detector overlays a wall on the gap of the image produced by removal of the image portion corresponding to the person's facial features or other body features. This has the advantage of retaining similar colouring as adjacent portions of the image.

Figure 8:
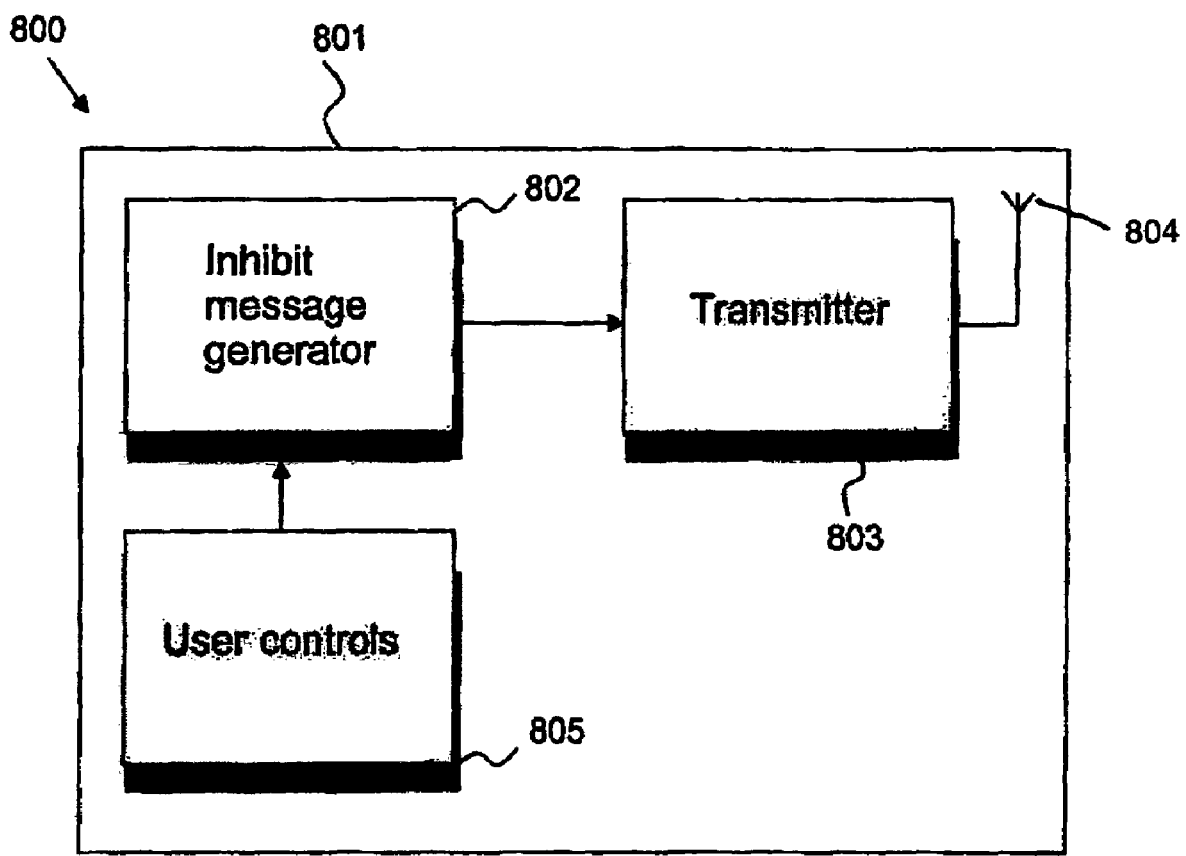
FIG. 8 is a schematic illustration of components of one specific embodiment of an inhibitor device.

FIG. 8 is a block diagram of components of an inhibitor device 800, corresponding to each of devices 100, 201, 300, 500 and 501. The inhibitor device 800 comprises a casing 801 containing a battery (not shown), a size and shape such that the casing easily worn by a person, or can be easily carried by a person, for example in the person's pocket. Casing 800 includes: (1) an inhibit message generator 802 for generating one or a plurality of inhibit message types; (2) a transmitter device 803 for transmitting one or more inhibit messages on a carrier signal; (3) an antenna 804 for generating an omni-directional inhibit transmit beam or one or a plurality of directional inhibit transmit beams; and a set of user controls 805 for enabling a person to turn the inhibitor device 80 on or off, and optionally for selecting an inhibit message type. Transmitter 803 is of any suitable type, e.g.; RF, microwave, optical or sonic. The battery powers each of generator 802, transmitter 803, and user controls 805.

The inhibitor device 800 can also comprise a memory device capable of storing a plurality of images of a person's face, in a plurality of views or orientations, and be capable of transmitting the images either in encoded or in un-encoded format.

Figure 9:
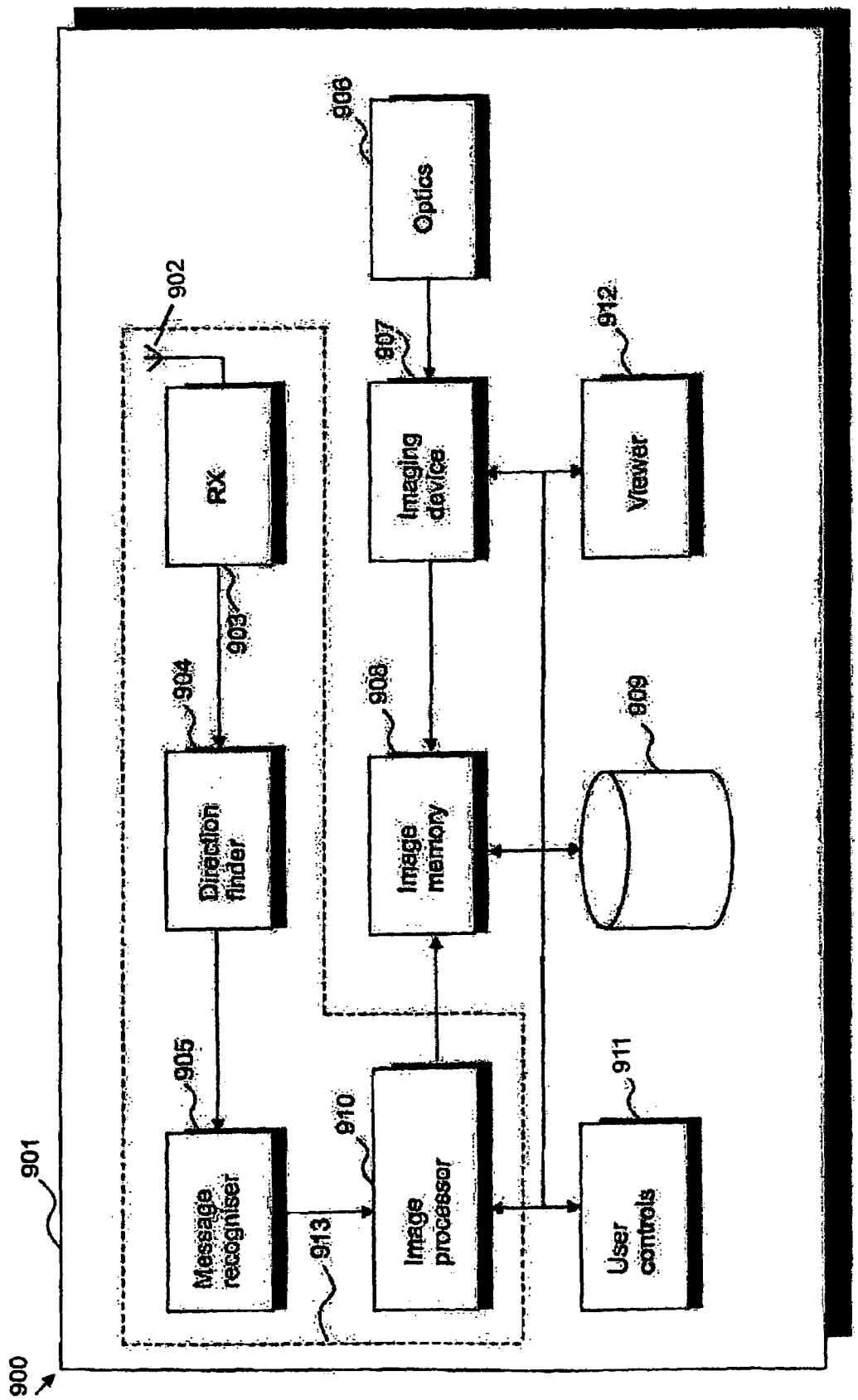
FIG. 9 is a schematic illustration of components of a specific embodiment of an image capture device.

FIG. 9 is a block diagram of components of an image capture device 900, corresponding to each of devices 101, 202, 302 or 502. The image capture device 100 comprises a casing 901 containing a battery or other power supply and an antenna 902 for receiving inhibit messages from antenna 804. Antenna 902 has either an omni-directional receive beam, or one or plural directional receive beams. Device 900 also includes receiver device 903 for receiving, amplifying and digitising a signal from antenna 902. Direction finder 904 responds to the signal from receiver 903 for identifying the direction from which an inhibit signal includes on antenna 902 has been received, that is, for identifying from which one or more of a set of directional beams, an inhibit signal was received on. Direction finder 904 drives message recogniser 905 for extracting inhibit messages from received signals and interpreting the type of inhibit message received by antennae 902.

Device 900 includes a set of optics 906 for capturing an optical image in response to a user input signal. Imaging device 907 is coupled with optics 906 for converting the received light image of optics 906 into two dimensional image data as one or more image data frames, including still images and/or video sequences of a plurality of image frames. Imaging device 907 drives image memory 908 for processing image data frames that in turn selectively drives image data storage device 909 for storing captured images. Image processor 910 responds to message recogniser 905 to apply data processing to captured image data frames. The data processing that processor 910 performs is in accord with the various prior art techniques previously described in connection with FIGS. 6 and 7. Image capture device 900 also includes a set of user controls 911 for controlling capture of images via the imaging device 907, and for controlling other functions such as storage of images in the image data store 909, and for monitoring image processing of image data. Device 900 also includes an image viewer 912, for example a liquid crystal display (LCD) or the like, driven by imaging device 907 for viewing captured images. The antenna, receiver, direction finder, message recognizer and image processor constitute an image inhibitor module 913. The battery or other power supply in casing 901 powers electronic parts 903-905 and 907-912.

The inhibit signal transmitted by the inhibitor device 800 can be a visual signal, for example a red coloured visual signal emitted by a light emitting device at a wave length of approximately 633 nm, or a green light emitted by an LED at a wave length of approximately 510 nm, or may comprise an infrared signal or a microwave or RF frequency signal.

In various alternative embodiments, signal detector 901 and receiver 903 can be an optical detector, such as a photo diode, for detecting visual or infrared signals; an ultrasonic detector for detecting ultrasonic signals, or an antenna for detecting radio frequency signals.

Registration of Inhibitor Devices

In a further modification of the image capture system described herein, individual inhibitor devices are registered with individual image capture devices, so as to override the normal inhibitor function of the inhibitor device with respect to those particular registered image capture devices. This function is useful in situations where inhibitor devices are worn by members of a family group, and one or more other members of the family group are carrying an image capture device. Persons within the family group may wish to have their image captured by their own family member, but want to prohibit capture of their images by other unknown third parties in a public place.

Figure 10:
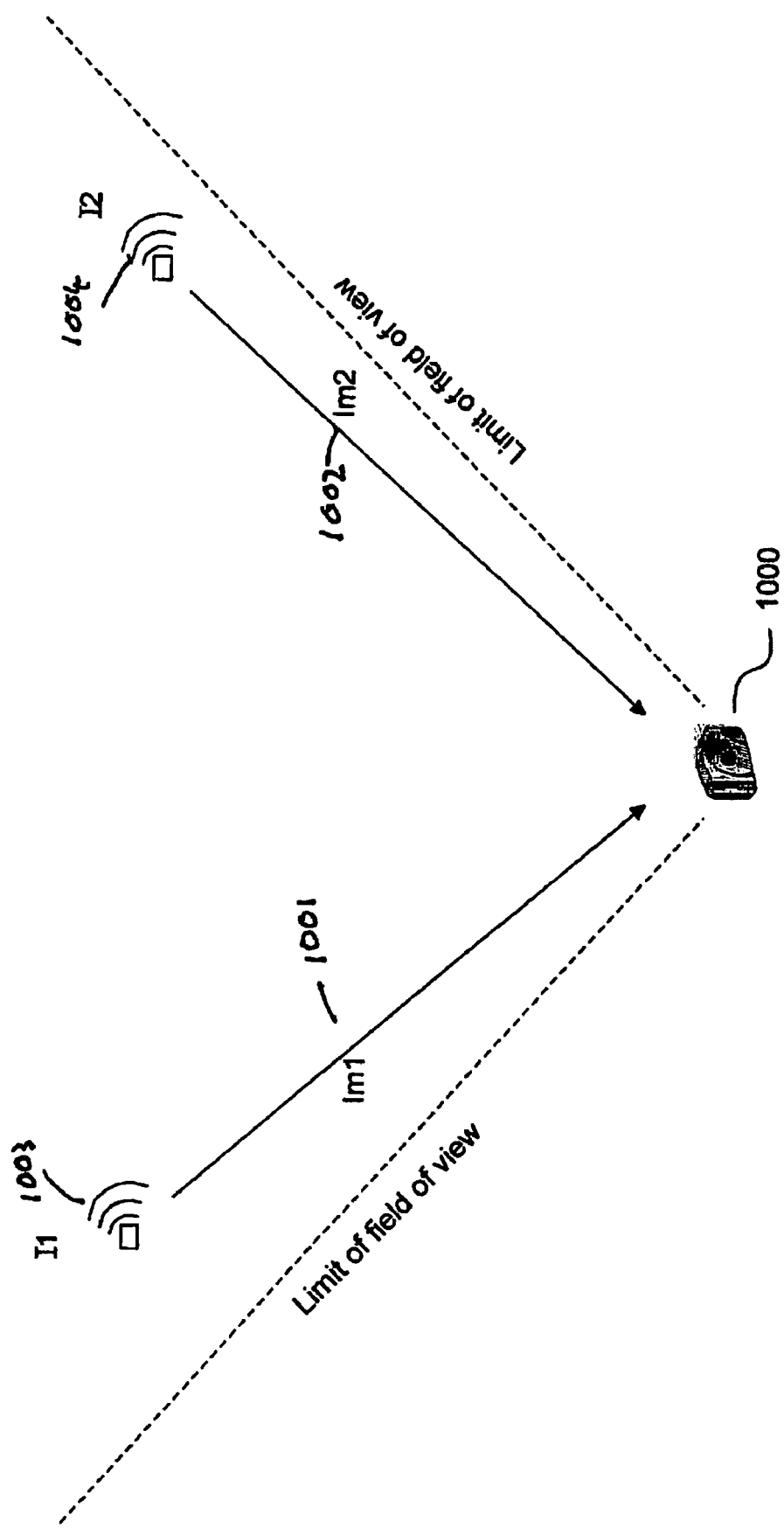
FIG. 10 is a schematic illustration of a scenario in which an image capture device captures an image in a field of view which includes users wearing first and second inhibitor devices, and the image capture device recognizes one of the inhibitor devices.

FIG. 10 is a schematic drawing of an image capture system, in which a plurality of inhibitor devices are pre-registered with one or more image capture devices, and in which the image capture device can ignore an inhibitor message emanating from a pre-registered inhibitor device. An image capture device 1000 receives first and second inhibitor message 1001, 1002 from first and second inhibitor devices 1003, 1004 respectively within a field of view of the image capture device. First inhibitor device 1003 sends an inhibitor message 1001 including a code which the image capture device 1000 recognises as denoting a known pre-registered inhibitor device. On the other hand, second inhibitor device 1004 sends a signal which is not recognised by image capture device 1000.

Figure 11:
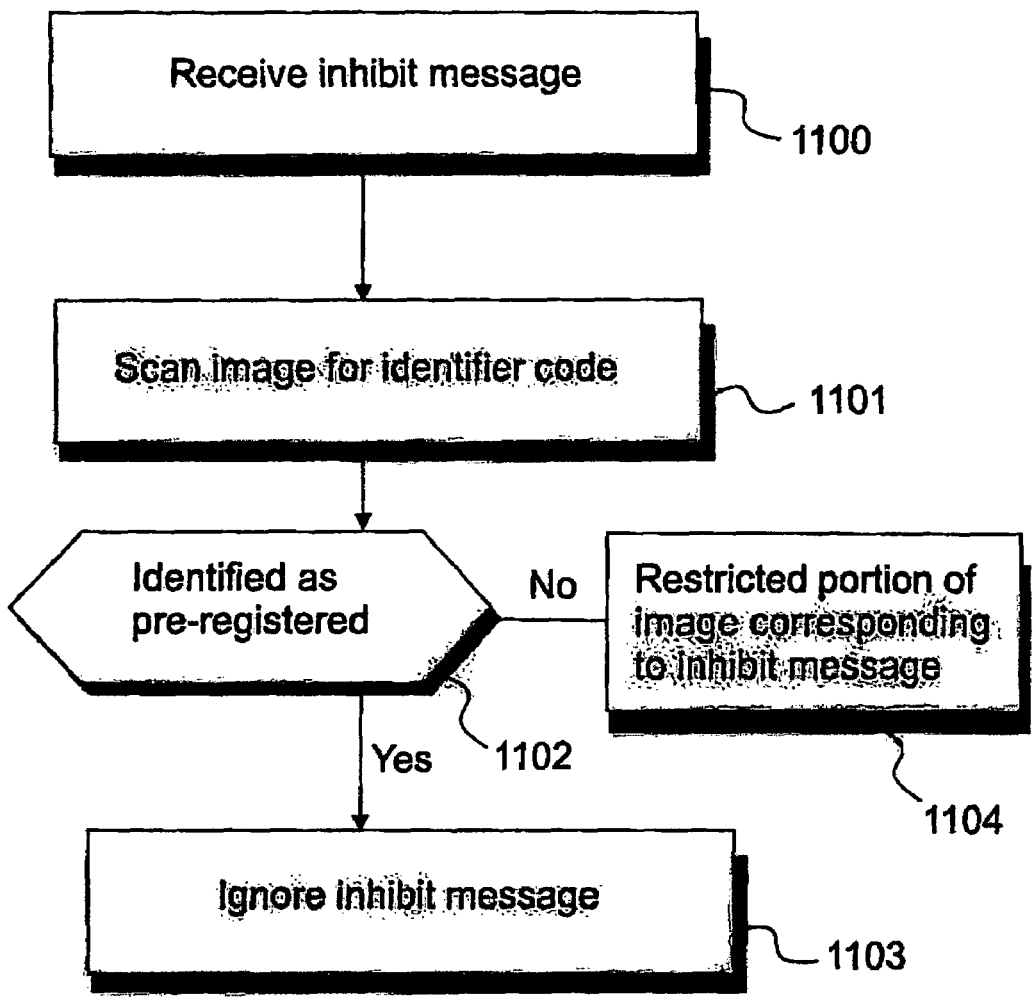
FIG. 11 is a schematic illustration of processes carried out by an image capture device for recognizing an inhibitor device.

FIG. 11 is a flow chart of processes carried out by image capture device 1000 upon receiving an inhibit message, for checking whether the inhibit message relates to a pre-registered inhibitor device. During step 1100, the image capture device 1000 receives an input message. Device 1000 then, during step 1701, reads the message, and checks for an identification code. If device 1000 recognises the identification code as one which is pre-registered with the image capture device (step 1102), the image capture device advances to steps 1103 and ignores the inhibit message, and therefore takes no action to process parts of a captured image identified by the existence of the inhibit message. In other words, device 1000 does not modify any part of the image. However, if during step 1102, device 1102 does not recognize the identification code as one which is pre-registered with the image captured device, operation advances to step 1104, during which the image capture device 1000 restricts a portion of the image corresponding to the inhibit message in step 1104.

Consequently, for an image in a field of view where a plurality of inhibitor devices are present, some of which are recognised by the image capture device 1000 and some of which are not, the image capture device modifies portions of the image corresponding to inhibitor devices, which are not recognised, and leaves un-modified portions of the image corresponding to inhibitor devices having recognised code.

Widespread usage of inhibitor devices can affect security cameras used in surveillance systems. In an environment such as a building society, bank, shop, gasoline filling station or the like public place, which are susceptible to criminal activity, criminals wearing inhibitor devices might inhibit a security camera to obscure details of the wearers' faces. Therefore, an embodiment includes a facility wherein an inhibit signal received by an image capture device can be overridden so that faces of wearers can be viewed. There are two main options for overriding the inhibit signal, that is (a) without the wearer's permission; and (b) with the wearer's permission.

A system wherein the inhibit signal can be overridden without the wearer's permission can be provided as a function built into the image capture device itself. However, building in such a function seriously compromises the privacy of wearers of inhibitor devices. In a more sophisticated embodiment, an operator of an image capture device can override an inhibit signal, only with permission of a trusted third party. In such a system, an operator of an image capture system sends an image to a trusted third party, having the modified image portions corresponding to a person's face, along with a request to reverse the obliteration of a specific person's facial features.

Figure 12:
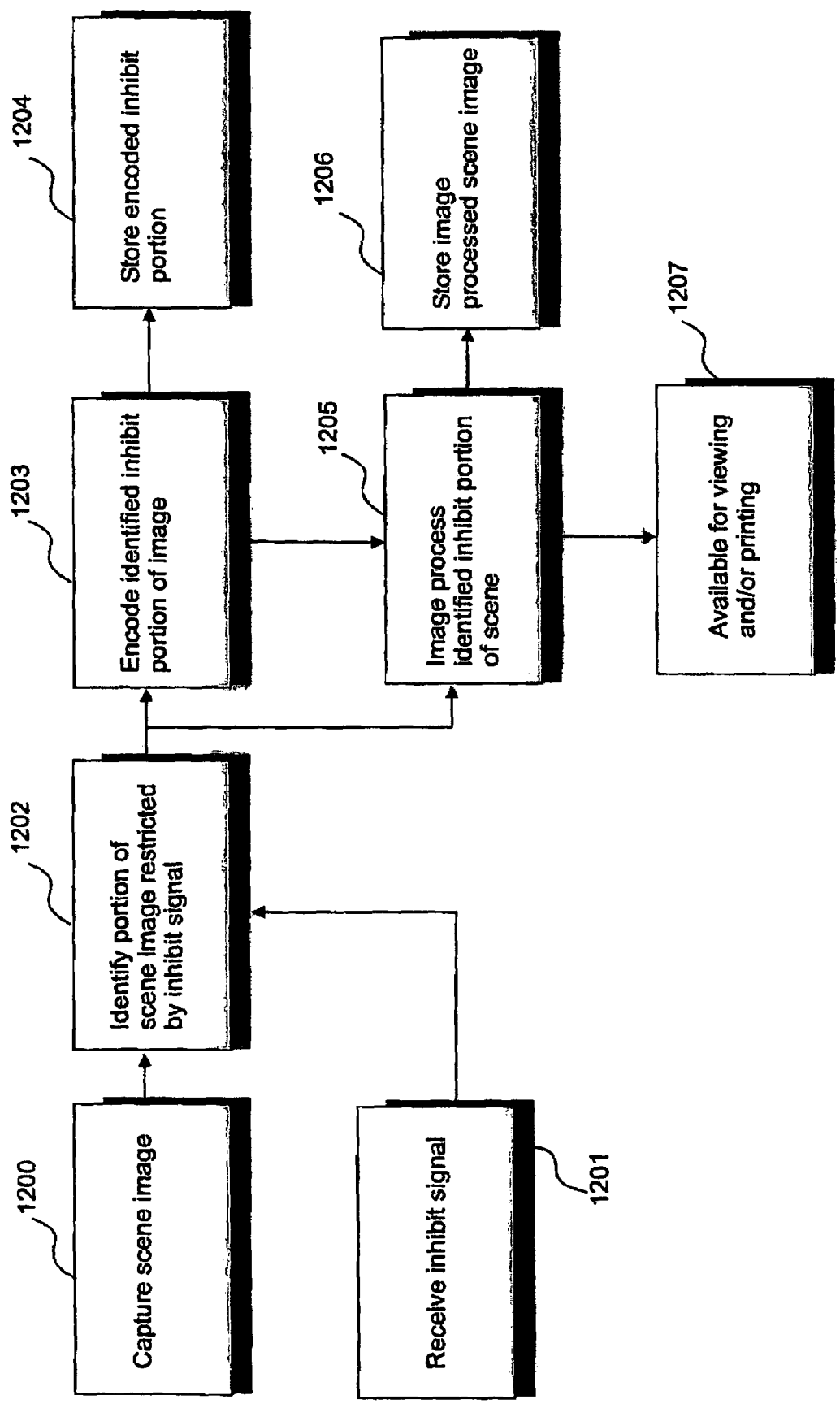
FIG. 12 is a schematic illustration of a signal processing channel within an image capture device.

FIG. 12 is a flow diagram of a signal processing channel within an image capture device for storing a captured scene image in such a way that the image can only be viewed, stored or printed with personal details obscured of persons wearing inhibitor devices, but with a capability of obtaining a clear image of those persons with external authorisation from a third party.

In step 1200, image capture device 1000 captures an image scene simultaneously with receiving an inhibit signal during step 1201. During step 1202, device 1000 identifies a portion of the scene image which is restricted by the inhibit signal. During step 1203 device 1000 encodes the identified portion of the image and then during step 1204 stores the image in an encoded format; encoding during step 1204 can include encryption, and protection with an encoding key. Therefore, if an encryption key is used device 1000 can only store inhibited portions of the image in an encrypted format under protection of the encryption key.

During step 1205, device 1000 processes the scene image so that inhibited portions of the scene are obscured or obliterated. The processed scene image, having portions of the image obliterated or obscured is then stored during step 1206, and/or made available for viewing or printing during step 1207.

Figure 13:
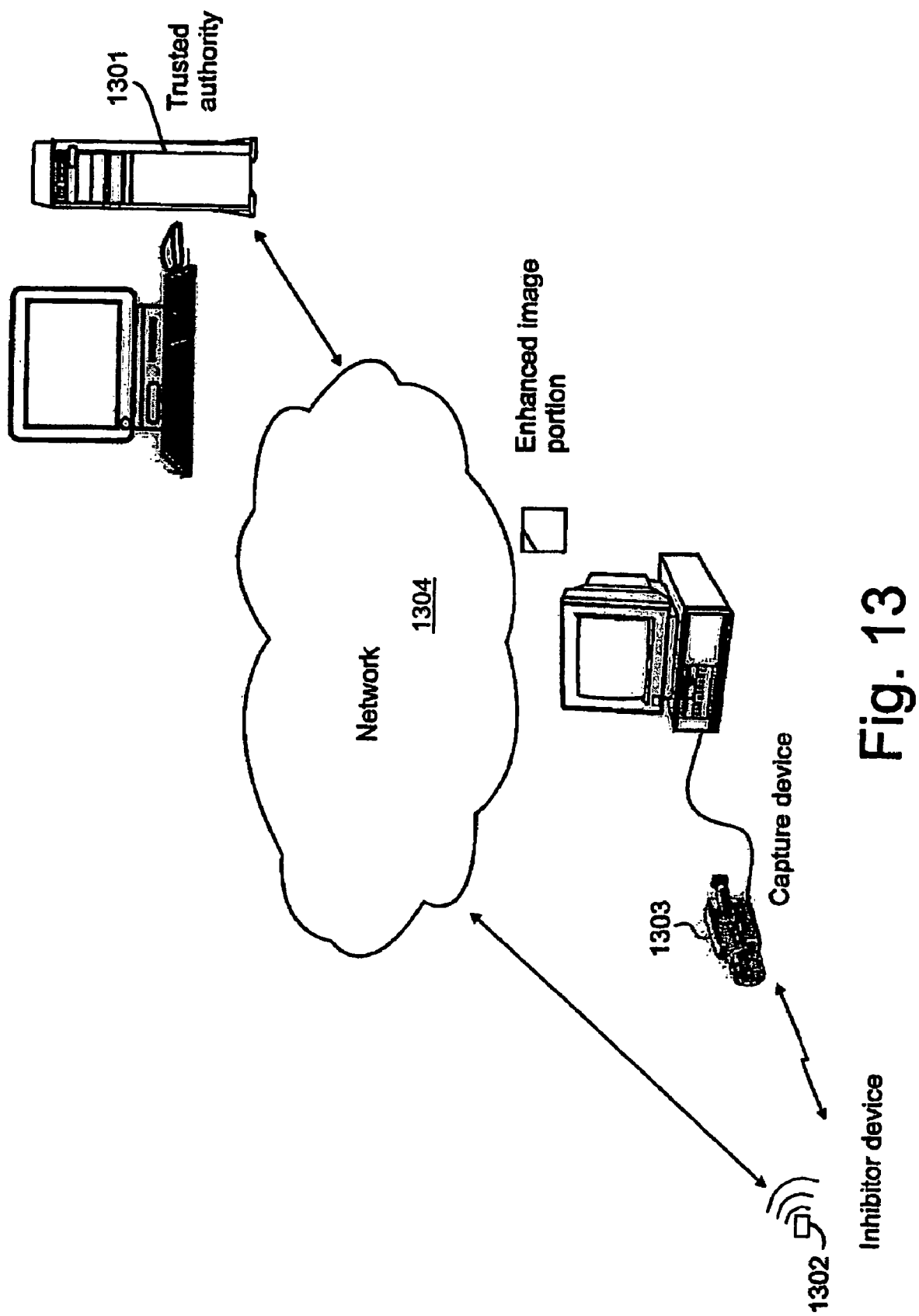
FIG. 13 is a schematic illustration of a communication link between an image capture device and a remote third party, for obtaining authorization for decoding a portion of a captured image.

FIG. 13 includes a communication network 1300 between an image capture device 1303 (in the form of a digital video camera) and a trusted third party computer 1301. Communication link 1304 is, for example, the Internet, for ascending an encoded image portion to a trusted computer authority 1301, for decoding, so that images of persons can be recovered from the encoded stored image portions under control of trusted authority 1301. When an operator of the image capture device 1303 wishes to obtain a clear image of a particular person who has inhibited capture of the image of the particular device using an inhibitor device, the user can only do so provided the trusted authority 1301 agrees to authorise production of a clear image portion free of the particular person. The operator of the image capture device 1303 cannot bypass the trusted authority 1301, since the stored image portions are encrypted, and can only be decrypted with a key available to an operator of the trusted authority.

Several further variations on the embodiments described herein can be incorporated as follows.

Figure 14:
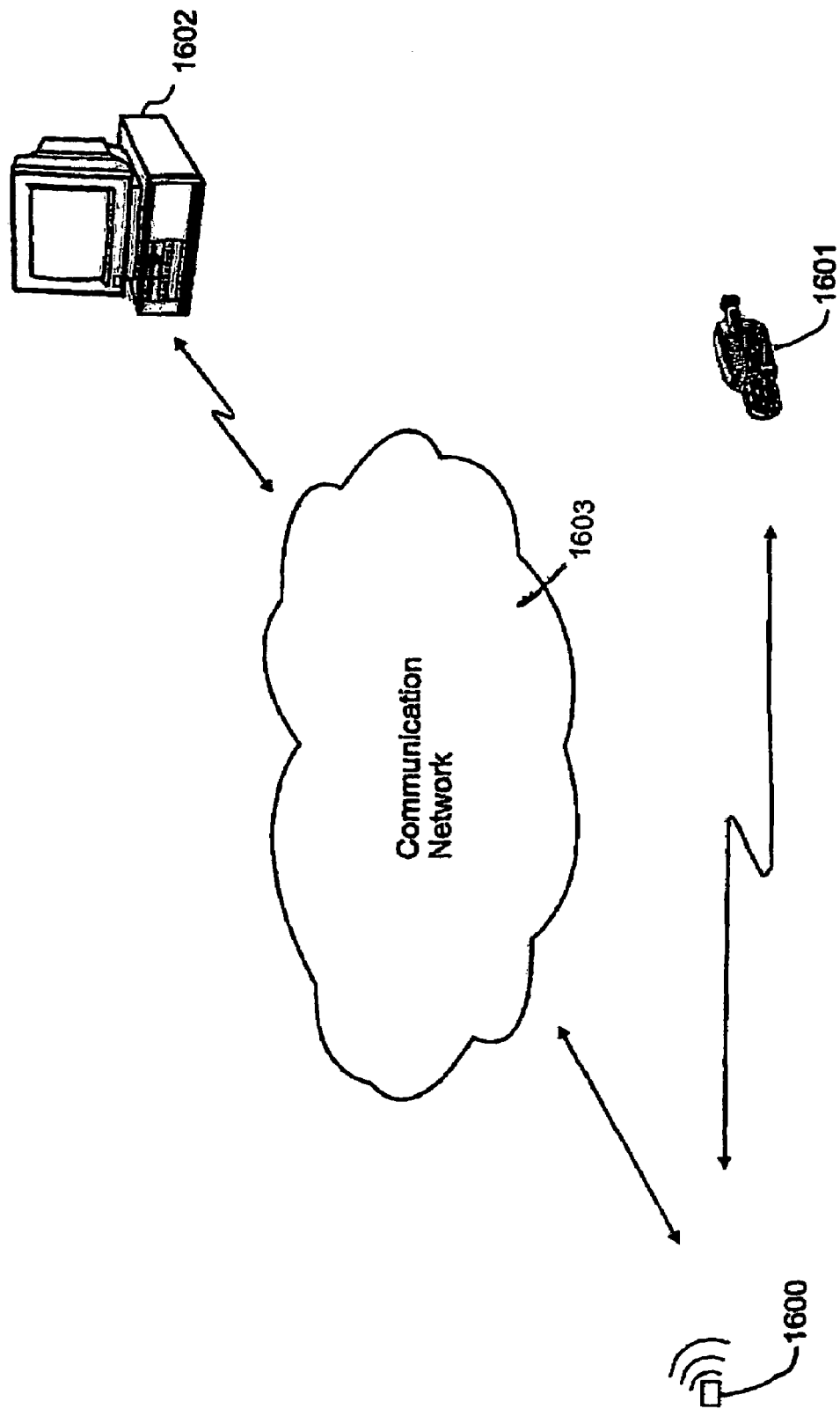
FIG. 14 is a schematic illustration of an image captured device, an inhibitor and a trusted third party.

FIG. 14 is a schematic illustration of a system including inhibitor device 1600 and a digital video camera that comprises image capture device 1601, and a remote trusted third party computer 1602. An image of a host wearer of inhibitor device 1600 is coupled to either an image inhibitor module (the same as module 913) within the image capture device 1601, and/or to a trusted third party computer 1602. The image is coupled to computer 1602 via a cellular telephone camera (not shown) that communicates with computer 1602 via a communicator network 1603 that can include a cellular phone network and the Internet. The image of the host wearer of the inhibitor device 1600 can be sent to computer 1602 either as a clear un-encoded image, or it can be sent as an encoded image, in order to prevent misappropriation of the image when it is being coupled between the person wearing inhibitor device 1600 and the image capture device 1601 or between the person wearing inhibitor device 1600 and the trusted third party computer 1602.

Image inhibitor device 1600 also transmits to an inhibit signal that is coupled to image capture device 1601 and/or computer 1602. Transmission of the inhibit signal from device 1600 to computer 1602 is via network 1603.

Operation of the image capture system of FIG. 14 is as follows. Image capture device 1601 captures an image of a scene in the optical field of view of the image capture device 1601. Within that scene, there may be one or more inhibitor devices 1600. The inhibitor devices 1600 announce their presence within the field of view to the image capture device 1601, by transmitting a recognition signal, which can be the inhibitor message as described previously with respect to the embodiment of FIG. 1. However, in addition to that message, the inhibitor device 1600 coupled to the image capture device 1601 sends an image of the host wearer. The image capture device 1601 matches that received image, with a portion of the image captured by the image capture device 1601, which corresponds to a host wearer of the inhibitor device 1600. Devices 1601 matches the image of the wearer of inhibitor device 1600 with a portion of the image scene captured by the image capture device 1601 by pattern matching or pattern recognition algorithms which match the host wearer's facial image with positions of the captured image scene to detect a match of profiles.

The image of the wearer of the inhibitor device 1600 sends to the image capture device 1601 may comprise several views of the face of the wearer of device 1600, so that the face can be recognised from a variety of different view angles.

In a further mode of operation of the embodiment of FIG. 14, the image(s) of the host wearer's face are sent to a trusted third party computer 1602 operated by an independent authority having responsibility for decoding portions of an image. The trusted third party computer 1602 uses the host wearer's image to recognize portions of a scene image which have been sent to the computer by image capture device 1601, to decode that part of the image as described previously with respect of the embodiment of FIG. 13. In this mode of operation, which has application for obtaining decoding of images taken by a security camera, the operator of the image capture device 1601 must obtain authorization to decode a portion of the image. The trusted third party computer 1602 uses the inhibit signal and the image of the wearer of device 1600, as received from network 1603, to decode an obliterated or modified portion of the scene image corresponding to the wearer's face, so that the operator of the image capture device 1601 can obtain from the trusted third party, a clear image of the host wearer's face.

Activation of the Image Inhibitor Module

In a further variation of the embodiments described herein, activation of an image inhibitor device depends upon either the distance between an image capture device and an inhibitor device, or an effective resolution of an image which the image capture device can capture.

In the first case, an inhibitor device and/or an image capture device are provided with known distance measuring devices, for example a diode laser based measuring system as known in the art. The image capture device measures the distance between itself and the inhibitor device within an optical field of view of the image capture device. In response to the distance measurement, the image inhibitor module of the image capture device is activated or de-activated. For inhibitor devices which are beyond a pre-specified range the image inhibitor module of the image capture device is deactivated, allowing the image capture device to store, print or display a scene image including an un-modified image of a host wearer's face. If the pre-specified distance is set correctly, the person will be so far in the distance, that the person will appear only as a small feature in the captured image, and it is difficult or impossible for persons examining that image to recognise the wearer of the inhibitor device due to the relatively small size of the image of the person as a proportion of the entire scene image.

In the second case, the image inhibitor module of the image sensor does not modify any image portions where facial features are not recognised due to the low resolution of the facial features. For example, this may be because the wearer of an inhibitor device is so far away from the image capture device within an optical field of view of that device or the field of view is so dark that the facial features of the viewer cannot be captured with a significantly high resolution such as to enable a person to recognise the wearer of the inhibitor device.

In a further variation, the inhibitor device worn by a person is in the same casing as an image capture device, to provide an image capture device performing the dual role of enabling a person to capture images of a scene, while the same time providing a degree of privacy to that person from having their image captured by other image capture devices. For example, the inhibitor device, and an image capture device having an image inhibitor module, can be incorporated in a single hand held device, for example a mobile phone, or still image camera, or hand held video camera device.

In a further variation, within the image capture system, individual security groups or levels of security can be implicitly or explicitly used to ensure that if a person carries an inhibitor device, it will still be possible for an authorised person, for example a family member, to be able to capture an image of the wearer of the inhibitor device.

By combining an inhibit message or inhibit signal with pattern recognition of facial features, that is, by comparing an image sent by the inhibitor device with portions of a scene image, a portion of a scene image relating to a wearer's face can be more accurately adjusted and finally located, and modified to obscure the facial details of that person.

Specific embodiments disclosed herein provide that a person who does not want his image to be captured can carry a portable device to communicate with one or more image capture devices, such as a camera, which that person may encounter, to inhibit those image capture devices from using images of the person. The image capture system is de-centralised, and need not rely on a centralised database of images of the person's face.

The invention claimed is:

1. A portable inhibitor device for use by a user, comprising a transmitter of an inhibitor message for restricting processing, by an image capture device, of a portion of an image corresponding to the user of said portable inhibitor device, wherein the inhibitor message is recognizable by the image capture device and is to cause an image processor in the image capture device to perform an action to restrict processing of the portion of the image corresponding to the user, and wherein the portable inhibitor device is external of and separate from the image capture device.

2. The portable inhibitor device as claimed in claim 1, wherein said inhibitor device is arranged to transmit said inhibitor message directionally.

3. The portable inhibitor device as claimed in claim 1, wherein said inhibitor device is arranged to transmit said inhibitor message omni-directionally.

4. The portable inhibitor device as claimed in claim 1, wherein said transmitter is arranged to transmit the inhibitor message comprising an infrared signal.

5. The portable inhibitor device as claimed in claim 1, wherein said transmitter is arranged to transmit the inhibitor message comprising a visual signal.

6. The portable inhibitor device as claimed in claim 1, wherein said transmitter is arranged to transmit the inhibitor message comprising a radio frequency signal.

7. An image capture system comprising:
   an image capture device, said image capture device including an image inhibitor component responsive to an inhibit signal transmitted by an inhibitor device carried by an object to restrict processing of a portion of an image captured by said image capture device,
   wherein said image capture device is external of and separate from the inhibitor device,
   wherein said image capture device includes an encoder responsive to the inhibit signal detected by the image inhibitor component for encoding the portion of said image captured by said image capture device, said encoded image portion corresponding to an image of said object.

8. The image capture system as claimed in claim 7, wherein the image capture device is configured to:
   send the encoded image portion to a trusted third party computer to allow the trusted third party computer to decode the encoded image portion to recover an image of the object.

9. The image capture system as claimed in claim 8, wherein the image capture device is configured to receive, from said trusted third party computer, the recovered image of the object.

10. An image capture system comprising:

an inhibitor device adapted to be mounted on a host wearer for restricting processing of image data corresponding to said host wearer, wherein the inhibitor device is to transmit an inhibit message to an image capture device comprising an image inhibitor component for restricting processing of the image data corresponding to the host wearer within a captured scene image, wherein said inhibitor device is external of and separate from the image capture device;

wherein said inhibitor device is arranged for sending at least one image of the host wearer of said inhibitor device to said image capture device to cause said image capture device to use said at least one image of the host wearer for recognizing an image portion corresponding to said host wearer within said captured scene image.

11. An image capture system comprising:

an inhibitor device adapted to be carried by a host wearer for restricting processing of image data corresponding to said host wearer, wherein the inhibitor device is arranged to transmit an inhibit signal to an image capture device to cause the image capture device to restrict processing of the image data corresponding to the host wearer, wherein the inhibitor device is external of and separate from the image capture device, wherein said inhibitor device is arranged to send at least one image of the host wearer of said inhibitor device to a third party computer entity, to cause said third party computer entity to use said at least one image of the host wearer for recognizing an image portion corresponding to said host wearer.

12. An image capture device comprising:

an optics system for forming an image; and an image inhibitor operable for receiving from an inhibitor device associated with a user that is external of and separate from said image capture device, an inhibit signal for inhibiting a portion of said image corresponding to the user; and an image processor responsive to detection of the inhibit signal by the image inhibitor to perform an action to restrict processing of the portion of the image corresponding to the user.

13. The portable inhibitor device as claimed in claim 1, wherein the inhibitor message is to cause the image processor in the image capture device to perform the action that modifies the portion of the image corresponding to the user.

14. The portable inhibitor device as claimed in claim 13, wherein modifying of the portion of the image includes one or more of: decreasing a resolution of the portion of the image; overlaying a graphic image on the portion of the image; defocusing the portion of the image; and darkening the portion of the image.

15. The portable inhibitor device as claimed in claim 1, wherein the transmitter is configured to further send an image of the user to the image capture device.

16. The image capture system as claimed in claim 7, wherein the image capture device is configured to modify the portion of the image to obscure the portion of the image in response to the inhibit signal.

17. The image capture system of claim 16, wherein the portion of the image is modified by one or more of: decreasing a resolution of the portion of the image; overlaying a graphic image on the portion of the image; defocusing the portion of the image; and darkening the portion of the image.

18. The image capture device as claimed in claim 12, wherein the image processor is to further receive an image of the user from the inhibitor device, and wherein the image processor is to match the received image of the user with the portion of said image formed by the optics system.

19. The image capture device as claimed in claim 12, wherein the action performed by the image processor includes modifying the portion of the image corresponding to the user.

20. The image capture device as claimed in claim 12, wherein modifying the portion of the image includes one or more of:

decreasing a resolution of the portion of the image; overlaying a graphic image on the portion of the image; defocusing the portion of the image; and darkening the portion of the image.

21. The image capture device as claimed in claim 12, wherein the image processor is to process image data captured by the optics system.

* * * * *